Figure 1:
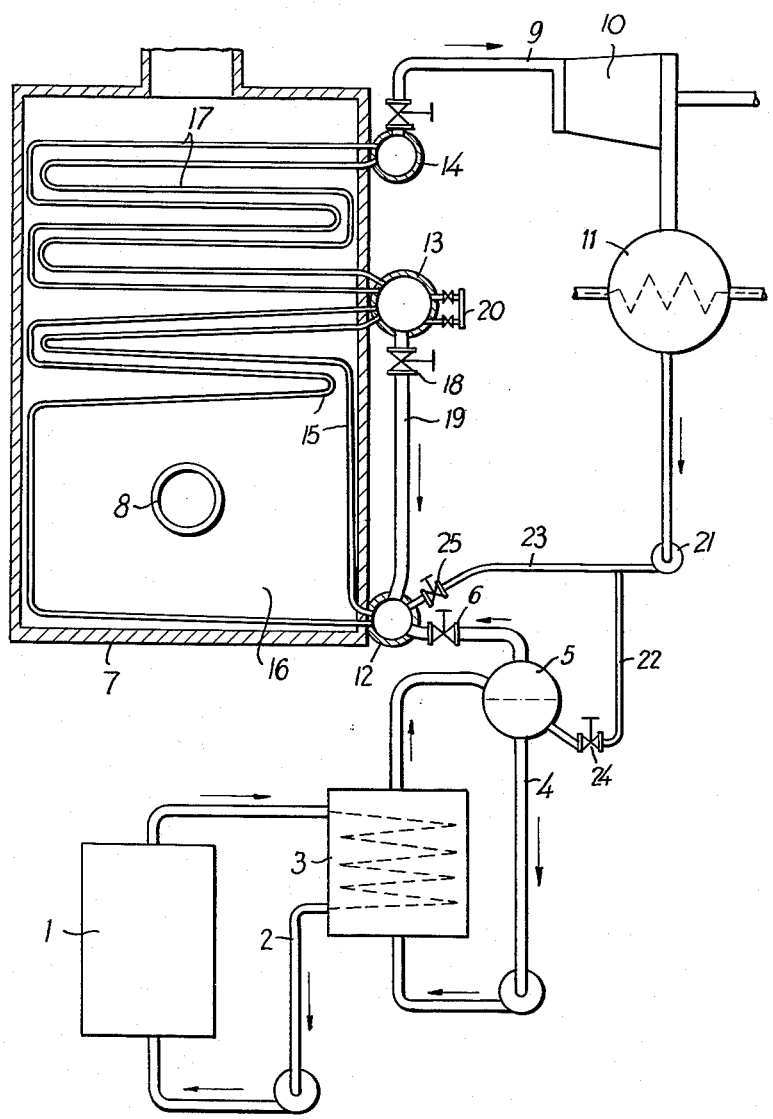

Aug. 22, 1961  P. A. WEDEL  2,997,032
STEAM POWER PLANT
Filed Feb. 18, 1957  2 Sheets-Sheet 1

Per Arvid Wedel
INVENTOR.

BY Purie, Scheffler & Parker
ATTORNEYS.

Aug. 22, 1961 P. A. WEDEL 2,997,032
STEAM POWER PLANT
Filed Feb. 18, 1957 2 Sheets-Sheet 2

Per Arvid Wedel
INVENTOR.

BY Purce, Scheffler & Parker
ATTORNEYS.

2,997,032
STEAM POWER PLANT
Per Arvid Wedel, Goteborg, Sweden, assignor to Aktiebolaget Gotaverken, Goteborg, Sweden, a corporation of Sweden
Filed Feb. 18, 1957, Ser. No. 640,854
Claims priority, application Sweden Mar. 6, 1956
2 Claims. (Cl. 122—33)

The present invention relates to a heat exchanger provided with a furnace and adapted alternatively to generate or to superheat steam, and a steam power plant, in which such a heat exchanger is included.

In certain types of steam power plants it might be advantageous to provide the primary steam generating part with its own furnace, and to superheat the steam in a separate unit provided with a second furnace. The conditions in the first mentioned furnace may be such, that sufficient heat for the superheating is not provided, for which reason a separate furnace is desired. In any case such a furnace provides good possibilities of regulating the degree of superheat.

Another problem is for instance to be found in industrial plants, where the steam demand during work days may be comparatively great, whereas during the holidays only a small quantity of steam is needed for heating purposes. As an example of an occasion where such problems arise, the cellulose pulp mills may be mentioned. Here the steam supply is, to a certain extent, based upon the combustion of waste liquor. This produces a combustion gas, which contains considerable quantities of fly ash with relatively low melting temperature, and as it is on many occasions necessary to supply additional fuel in order to cover the total demand of superheated steam, it might be advantageous to arrange the superheater part, where blocking by fly ash is most likely to occur, outside the primary furnace and to heat said part with the additional fuel, such as oil or the like. During the holidays only a part of the steam quantity necessary for the normal management of the plant is needed. This makes it uneconomical to have the main boiler working, especially as the supply of waste liquor will cease when the plant stops, and the heat will have to be produced by the additional fuel only.

Other occasions to be considered are such plants, in which the primary heat source consists of a nuclear reactor. The heat transmission to the working steam usually occurs indirectly, which implies a limitation in the possibilities of superheating, and makes a separately fired superheater desirable. In a marine plant of this kind, there is needed a reduced quantity of steam, partly as a reserve in the event of a breakdown of the main plant, and partly for maneuvering the ship going into or out of harbours with the reactor shut down. During the stay in harbour a quantity of steam is needed for the auxiliaries only, which is considerably less than what is needed at sea. For these occasions, which lie outside the scope of the normal management, a separate boiler fired with ordinary fuel is needed.

The whole plant will be considerably simpler if a separately fired superheater is arranged in such a manner, that it may alternatively be used for generating a certain quantity of steam, and according to the invention the superheater is designed as a heat exchanger, consisting of tube banks for the heat absorbing medium, which tubes run from an inlet to a collecting header, from which a return pipe provided with shut off means leads back to the inlet, and the heat exchanger is provided with supply pipes for steam and feed water, respectively, each of said supply pipes being provided with shut off means.

Two embodiments of the invention will now be described, by way of example, with reference to the accompanying drawings, in which FIG. 1 shows schematically a marine steam power plant, where the primary heat source consists of a nuclear reactor and FIG. 2 a plant, where the main boiler is of ordinary design and heated with waste liquor.

According to FIG. 1 the steam plant contains a reactor 1 of suitable design. This is cooled by a medium circulating through a piping system 2, in which there is included a heat exchanger 3. Here working steam is generated indirectly in a second circulating system, which includes piping 4 and a steam drum 5.

The steam generated here is conveyed by means of a pipe provided with a shut off valve 6 to a heat exchanger 7, which is encased in a furnace chamber provided with firing means, for instance a fuel oil burner 8. When the steam has been superheated here, it leaves the heat exchanger by way of a pipe 9 and is conveyed to a turbine 10, which may be directly connected to the propeller by gearing, or which may drive electric generators adapted to feed electric propulsion motors.

The steam exhausted from the turbine is led to a condensor 11, from which the condensate is returned as feed water to the primary steam generating plant or to the heat exchanger, as will be related below.

The heat absorbing part of the heat exchanger consists of tube banks, which are connected to three headers 12, 13 and 14, respectively. From the lower of these runs a first tube bank 15, which first covers the walls of the furnace 16, and then forms a convection heating surface in the smoke gas flue. The tubes are then connected to the middle header 13.

From this a second bank of tubes 17 runs through the upper part of the flue to the upper header 14, to which the afore-mentioned steam outlet pipe is connected.

Between the middle header 13 and the lower header 12 a return flow pipe 19 is furnished, said pipe being provided with a shut off valve 18. The middle header 13 has such a volume, that it may serve as a steam drum, and is provided with a water gauge 20, as well as other suitable instruments and means, not shown here, which are customarily found in connection with steam boilers, for instance automatic feed water regulators.

The feed water obtained in the condenser may, by means of a pump 21, be conveyed either through a pipe 22 to the steam drum 5, or through a branch pipe 23 to the lower header 12. In each of the supply pipes there is provided a shut off valve 24 and 25, respectively.

During normal conditions the steam generated in the primary system is led to the heat exchanger 7, where it first passes tube bank 15 and then tube bank 17. By regulating the combustion in the burner 8 a suitable degree of superheat is easily obtained.

On account of the dangers associated with the reactor it might be preferable to shut this down during the ship's stay in harbour, and also during the voyage into and out of the harbour. The design of the separately fired superheater makes it possible to generate steam in this part only, and the heat exchanger ought to be given such dimensions, that it is possible to obtain a quantity of steam sufficient for operating the ship at reduced speed. Through proper adjustment of the heating surfaces of the two tube banks it is also possible to obtain approximately the same degree of superheat with this smaller quantity of steam, so that the propulsion turbine may be used without complications. This also provides a reserve plant, which makes the ship operable even if the primary steam plant should break down during the voyage.

On such occasions, when the smaller steam quantity is to be used only, the feed water supply through pipe 22 to the steam drum 5 is shut off by means of valve 24.

At the same time the valves 18 and 25 are opened, and the heat exchanger is filled with water up to a desired level. By means of suitable regulating devices of known design further feed water is supplied in such a manner that this level is kept constant. The tube bank 15 and the return pipe 19 form together with the headers 12 and 13 a circulating system for the water in the same manner as in a boiler of common design, and steam is collected in the drum 13. This may be provided with separating means of known design. During the passage through bank 17 the steam will be superheated and is then led to the turbine.

The details of the plant may vary in many respects within the limits of the accompanying claims. The primary steam generating part from the reactor 1 to the steam drum 5 has no direct bearing upon the invention, and may be of any suitable type.

Figure 2:
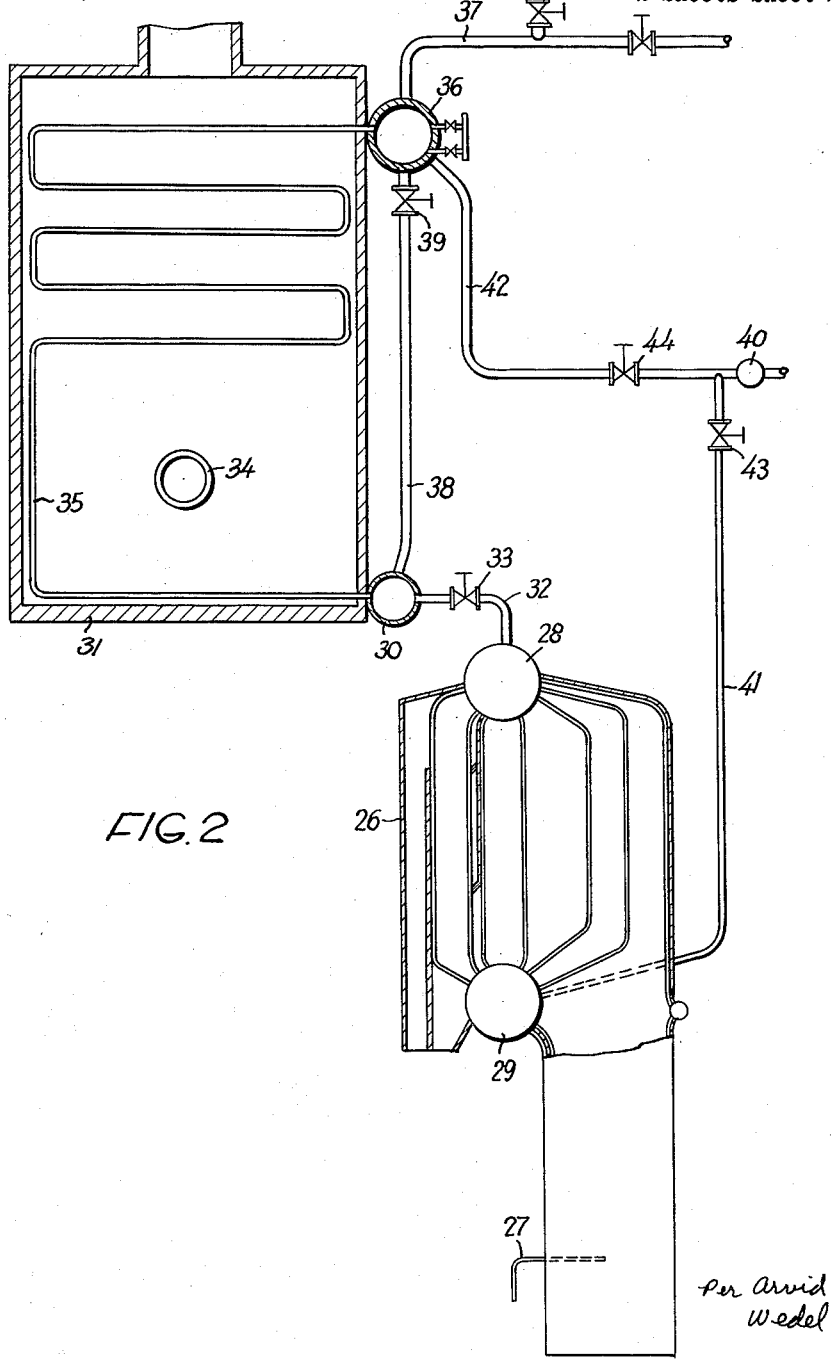

The embodiment shown in FIG. 2 is designed for industrial plants, where a small quantity of steam during holidays is needed for heating purposes only and no superheating is desired. The main boiler 26 is of any common type and arranged for the combustion of waste liquor from a paper mill. Said liquor is fed to the burners in the furnace chamber of the boiler through a pipe 27. The boiler is provided with an upper drum 28 and a lower drum 29 said upper drum 28 being connected to the lower header 30 of the heat exchanger 31 by a tube 32 in which a shut off valve 33 is inserted.

Through the furnace chamber of the heat exchanger 31, which is provided with a burner, for instance a fuel oil burner 34, a tube bank 35 runs to an upper header 36 to which an outlet pipe 37 for the steam is connected. Said upper header 36 is also connected with the header 30 by means of a return flow pipe 38 provided with a shut off valve 39.

Feed water is by means of a pump 40 conveyed either to the drum 29 of the boiler 26 through a pipe 41 or to the header 36 through a pipe 42 each of said pipes being provided with a shut off valve 43 and 44, respectively.

During normal conditions the valves 33 and 43 are open and steam generated in the boiler 26 is led to the heat exchanger 31, which is then acting as a superheater, the superheated steam being collected in the header 36. The valves 39 and 44 are then shut off.

When only a small quantity of saturated steam is required the boiler 26 is shut off and the heat exchanger 31 acts as a boiler. The valves 33 and 43 are shut off while the valves 39 and 44 are opened so that feed water is fed to the header 36 and the circulating water is returned to the lower header 30 through the pipe 38.

The tube banks in the separately fired superheater may be designed according to the "once-through"-principle, that is, be shaped of a continuous tube coil which is repeatedly bent. On such occasions the headers 12 and 14 are dispensed with. The tubes will have to be arranged in such a manner, that they utilize the existing space and the heat content of the smoke gases in the best possible manner. It is implied, that the return pipes 19 and 38, respectively, according to the size of the plant, may consist of several parallel pipes, which will all be provided with shut off means. On certain occasions it may be preferable to arrange pumps for circulating the water in the steam generating part in connection with the return pipes.

What is claimed is:

1. A steam power plant comprising a primary steam generator provided with its own heating means, a secondary heat exchanger spaced from said primary steam generator and provided with its own heating means, a first and a second bank of tubes in said heat exchanger, the tubes of said first bank being adapted alternately to generate or to superheat steam, vertically spaced lower, middle and upper headers associated with said heat exchanger, the first bank of tubes being connected between said lower header and said middle header and the second bank of tubes being connected between said middle header and said upper header, a return pipe in communication between the lower and the middle header, first shut-off means in said return pipe, a first supply pipe connecting the first tube bank with a steam collecting part of the primary generator, a second supply pipe connecting the first tube bank with a source of feed water, and second and third shut-off means in each of the supply lines, respectively.

2. A steam power plant comprising a primary steam generator provided with nuclear reactor heating means the cooling medium of which generates saturated or slightly superheated steam, a secondary heat exchanger spaced from said primary steam generator and provided with conventional fuel firing means, a first and a second bank of tubes in said heat exchanger, the tubes of said first bank being adapted alternately to generate or to superheat steam, vertically spaced lower, middle and upper headers associated with said heat exchanger, the first bank of tubes being connected between said lower header and said middle header and the second bank of tubes being connected between said middle header and said upper header, a return pipe in communication between the lower and the middle header, first shut-off means in said return pipe, a first supply pipe connecting the first tube bank with a steam collecting part of the primary generator, a second supply pipe connecting the first tube bank with a source of feed water, and second and third shut-off means in each of the supply lines, respectively.

References Cited in the file of this patent

UNITED STATES PATENTS

| | | |
|---|---|---|
| 1,860,363 | La Mont | May 31, 1932 |
| 1,860,364 | La Mont | May 31, 1932 |
| 1,890,468 | Noack | Dec. 13, 1932 |
| 1,972,052 | La Mont | Aug. 28, 1934 |
| 1,972,356 | Pfleiderer | Sept. 4, 1934 |
| 2,065,782 | Wood | Dec. 29, 1936 |
| 2,404,792 | Dalin | July 30, 1946 |
| 2,702,026 | Dalin | Feb. 15, 1955 |

FOREIGN PATENTS

| | | |
|---|---|---|
| 679,083 | Great Britain | Sept. 10, 1952 |

OTHER REFERENCES

Facts about Con. Edison's Indian Point Nuclear Electric Generating Station, September 1955.